Figure 1:
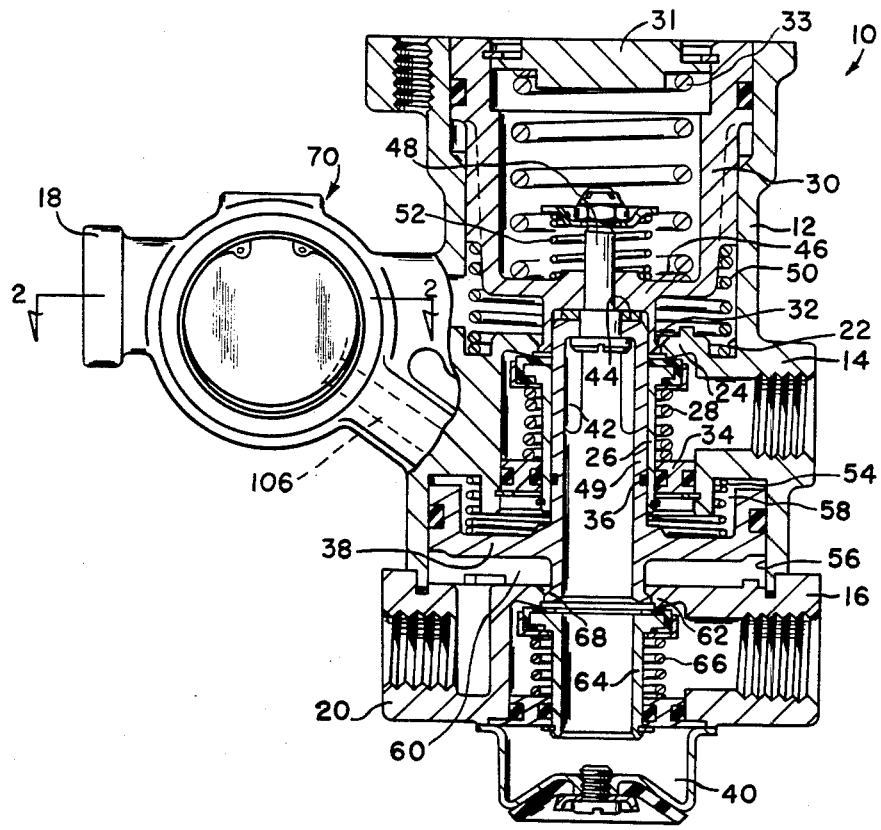

United States Patent [19]

Pugh et al.

[11] Patent Number: 4,553,789
[45] Date of Patent: Nov. 19, 1985

[54] DUAL BRAKE VALVE WITH BRAKE PROPORTIONING

[75] Inventors: James G. Pugh, Elyria; Richard W. Carmichael, Parma, both of Ohio

[73] Assignee: Allied Corporation, Morristown, N.J.

[21] Appl. No.: 608,688

[22] Filed: May 10, 1984

[51] Int. Cl.$^4$ .............................................. B60T 11/12
[52] U.S. Cl. ...................................... 303/54; 303/6 C; 303/7
[58] Field of Search ................... 303/6 C, 6 R, 7, 13, 303/40, 52, 54

[56] References Cited

U.S. PATENT DOCUMENTS

| | | | |
|---|---|---|---|
| 3,580,646 | 5/1971 | Ternent | 303/52 |
| 4,230,373 | 10/1980 | Plantan | 303/7 |
| 4,261,624 | 4/1981 | Plantan | 303/7 |
| 4,348,062 | 9/1982 | Koenig | 303/6 C |
| 4,368,926 | 1/1983 | Bartholomew | 303/7 |

Primary Examiner—Duane A. Reger
Attorney, Agent, or Firm—Ken C. Decker; W. N. Antonis

[57] ABSTRACT

A dual circuit brake valve for an articulated vehicle is responsive to a pressure signal provided by the system tractor protection valve to provide a full brake application in both the primary and secondary braking circuits actuating the front and rear wheel brakes of the vehicle respectively when the portions of the articulated vehicle are connected for movement together. A proportioning piston is responsive to the pressure signal to proportion braking pressure in the secondary when the towing portion of the vehicle is operated in the "bobtail" mode without the towed portion of the vehicle. The brake valve includes mechanism for mechanically actuating the secondary circuit valve to provide a full brake application under emergency conditions during operation of the vehicle in the bobtail mode.

11 Claims, 2 Drawing Figures

DUAL BRAKE VALVE WITH BRAKE PROPORTIONING

This invention relates to a dual circuit brake valve for a fluid pressure braking system in which the brake pressure communicated to the rear wheel brakes of the towing portion of an articulated vehicle is automatically reduced when the towing portion of the vehicle is operated in the "bobtail" mode without the towed portion.

Heavy duty articulated vehicles comprising a towed unit and a towing unit are in common use. Normally, the vehicle is operated with both the towed vehicle and the towing vehicle connected together; however, occasionally the towing unit must be operated in the so-called "bobtail" mode, in which it is operated without a towed unit. Of course, the rear wheel brakes of the towing unit must be a size to accommodate the weight of a loaded towed vehicle. However, when the towing vehicle is operated in the so-called "bobtail" mode without the towed vehicle, the brakes on the towing vehicle are quite dangerous, particularly when operated on wet or slick surfaces, since the brakes of the towing vehicle are then over-sized and tend to lock up quickly.

Prior art solutions to this problem, such as those disclosed in U.S. Pat. Nos. 4,261,624, 4,348,062, 4,230,373 and 4,368,926, provide one or more separate proportioning valves in the front and/or rear brake lines of the towing vehicle to maintain brake balance under all conditions. The present invention proposes the incorporation of a proportioning device within a conventional dual circuit brake valve, such as the brake valve disclosed in U.S. Pat. No. 3,580,646. This valve uses a relay piston to control fluid communication in the secondary braking circuit. Accordingly, the proportioning communication to the relay piston, braking pressure can be reduced to the rear wheel brakes of the towing vehicle when it is operated in a "bobtail" mode. Furthermore, by incorporating a proportioning device within the dual circuit brake valve, "push-through" capability is provided so that the effect of the proportioning device can be overridden and full braking pressure can be applied to the rear wheel brakes in emergency situations.

Figure 2:
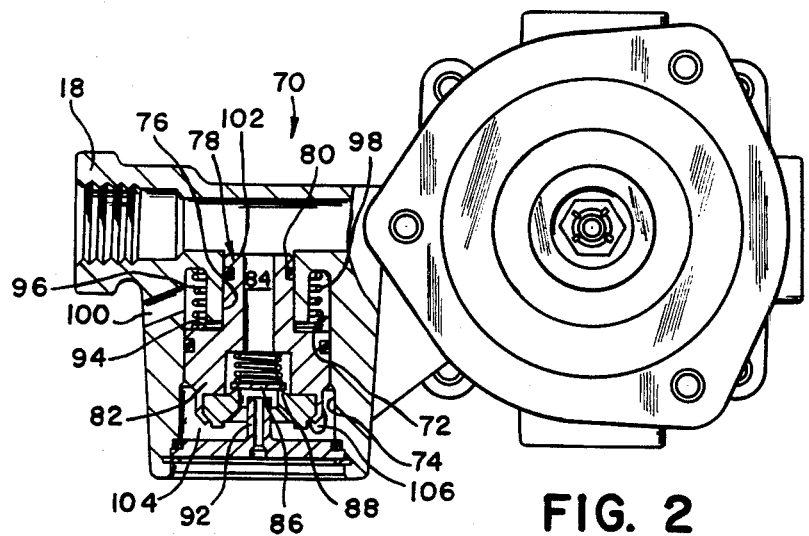

Other features and advantages of the invention will becme apparent from the following description with reference to the accompanying drawings in which:

FIG. 1 is a view, partly in section, of a dual brake valve made to the pursuant to the teachings of my present invention; and FIG. 2 is a view taken substantially along lines 2—2 of FIG. 1.

Referring now to the drawings, a dual brake valve generally indicated by the numeral 10 includes a housing 12 having inlet ports 14, 16 and outlet ports 18, 20 which correspond to the inlet ports 14 and 16 respectively. The inlet port 14 and outlet port 18 are communicated in the primary braking circuit which actuates the front wheel brakes of the vehicle on which the valve 10 is mounted, and the inlet port 16 and outlet port 20 are communicated in the secondary braking circuit which actuates the rear wheel brakes of the vehicle.

The housing 12 defines a bore 22 therewithin. A circumferentially extending valve seat 24 extends from the housing 12 and circumscribes the bore 22. An annular valve member 26 is urged into sealing engagement with valve seat 24 by a spring 28 to control communication between the inlet port 14 and outlet port 18 of the primary braking circuit. A graduating piston or plunger 30 is slidably mounted in the bore 22, and a disc 31 slidably mounted in piston 30 is operated by a conventional brake pedal (not shown) mounted in the vehicle operator's compartment which engages the upper surface of the disc 31. A graduating spring 33 between the disc 31 and graduating piston 30 urges the latter apart. An axially projecting lip 32 extends from the lower portion of the plunger 30 viewing FIG. 1 and is adopted to engage the valve member 26.

The valve member 26 is guided by an annular member 34 secured in the bore 22 and by an axially extending annular stem 36 which extends from a relay piston 38 which will be more fully described hereinafter. The member 34 is sealed both to the wall of the bore 22 and to the annular valve member 26. The bore 22 downstream of the valve members 24, 26 is communicated with an exhaust port 40 when the brakes of the vehicle are released through elongated apertures 42 provided in the stem 36.

The upper surface 44 of the stem 36 is engaged by the portion 46 of the plunger 30 to provide a mechanical link between the plunger 30 and the relay piston 38 upon downward movement of the piston 38. A bolt 48 carried by portion 49 of relay piston 38 is slidably received by piston 30. A return spring 50 urges the plunger 30 upwardly in viewing FIG. 1. A spring 52 circumscribes bolt 48 and yieldably urges relay piston 38 upwardly viewing FIG. 1, in opposition to spring 54 which urges piston 38 downwardly. Since spring 52 is stronger than spring 54 and spring 50 is stronger than spring 52, plunger 30 and relay piston 38 are urged into the positions illustrated in the drawing when the brakes of the vehicle are released.

The bore 22 includes a larger diameter portion 56 which slidably and sealingly receives the relay piston 38. Accordingly, the relay piston 38 divides portion 56 of the bore 22 into an upper portion 58 and a lower portion 60 viewing FIG. 1. Portion 60 is communicated with the outlet port 20 and thus acts as an outlet chamber in the secondary brake pressure circuit. An annular valve seat 62 circumscribes the bore 22, and an annular valve member 64 cooperates with the valve seat 62 to control communication from inlet port 16 to the outlet port 20. A spring 66 yieldably urges the valve member 64 into sealing engagement with valve seat 62. The stem 36 terminates in a lip 68, similar to lip 32, which is adapted to engage the valve element 64 to operate the latter to control communication between the ports 16, 20, and 40. When the lip 68 is spaced from the valve element 64 as illustrated in FIG. 1, the fluid pressure in the chamber 60 and outlet port 20 is vented through the annular valve member 64 to the exhaust port 40.

The housing 10 includes an extension generally indicated by the numeral 70. The extension 70 defines a stepped bore 72 having a larger diameter portion 74 and a smaller diameter portion 76 therein. The bore 72 extends transversely to the bore 22. A differential area proportioning piston generally indicated by the numeral 78 is slidably mounted in the bore 72 and includes a smaller diameter portion 80 which is received within the smaller diameter portion 76 of the bore 72 and a larger diameter portion 82 which is received within the larger diameter portion 74 of the bore 72. Piston 78 has an axial bore 84 which extends all the way through the piston. A valve member 86 is disposed within the bore 84. The valve member 86 is yieldably urged into sealing engagement with an annular valve seat 88 which circumscribes the bore 84 by a spring 90. An extension 92 projects from the end of the bore 72 which cooperates with the valve member 86 to control communication through the bore 84 as will be described in detail hereinafter.

A shoulder 94 is defined on the piston 78 where the larger portion of the latter joins the smaller portion of the latter. The shoulder 94 cooperates with the wall of the bore 72 to define a control chamber 96 therebetween. A spring 98 is disposed in the control chamber 96 and yieldably urges the piston 78 downwardly viewing FIG. 2. A control port 100 communicates the shoulder 94 with the trailer supply line (not shown) at the outlet of the tractor protection valve (not shown). The tractor protection valve is conventional, and the trailer supply line is communicated with a fluid pressure source at all times when the towed portion and towing portion of the vehicle are connected for movement together, but is vented to atmosphere when the towing portion of the vehicle is operated in the "bobtail" mode. Accordingly, when the towed portion and towing portion of the vehicle are connected for movement together, a pressure signal is present at the port 100, but the port 100 is vented to atmosphere when the vehicle is operated in the "bobtail" mode. The face 102 of the piston 78 defined by the smaller diameter portion 78 of the latter is exposed to the pressure level in the outlet port 18, and the pressure level in the chamber 104 defined by the larger diameter portion of the piston 78 in the end of the bore 72 is communicated to the chamber 58 above the relay piston 38 in FIG. 1 through a passage 106.

In operation, the various components of the dual brake valve 10 are illustrated in the drawings of the piston positions which they assume when the braking system of the vehicle is completely discharged. When the vehicle is to be moved, the vehicle's air reservoirs (not shown) are charged, and fluid pressure is communicated to the ports 14 and 16. If the towing unit is connected for movement of a towed unit and the appropriate brake lines are properly installed between the vehicles, pressure will be communicated to the control port 100 as described hereinabove. The pressure of control port 100 urges the piston downwardly so that the valve element 86 is held away from the seat 88 by the extension 92, thereby permitting substantially uninhibited fluid communication through the bore 84 from the outlet port 18 to the passage 74.

When a brake application is effected, the disc 31 and graduating piston 30 are moved downwardly viewing FIG. 1 by operation of the vehicle brake pedal. The lip 32 first engages the valve element 26, thereby cutting off fluid communication from the outlet port 18 and the exhaust 40. Further movement of the pedal an incremental amount urges the valve element 26 downwardly viewing FIG. 1, thereby breaking the sealing connection between the valve element 26 and the valve seat 24 to permit communication from the inlet port 14 to the outlet port 18. When the fluid pressure in the chamber communicating to outlet port 18 is sufficient to overcome the force of graduating spring 33, piston or plunger 30 moves upwardly, permitting the valve element 26 to return to the lap position in which communication between outlet port 18 and both the inlet port 14 and exhaust port 40 is cut off until the vehicle operator changes the force on disc 31. Fluid pressure communicated to the outlet port 18 is also communicated through the bore 84 of the piston 78 as described hereinabove so that substantially uninhibited fluid communication is permitted through the passage 74 into the chamber 58 above the relay piston 38 in FIG. 1. Fluid pressure in the chamber 58 urges the valve stem 36 dwnwardly viewing FIG. 1, first bringing the lip 68 carried thereon into sealing engagement with the valve element 64, thereby breaking communication between the outlet chamber 60 and the exhaust 40. Further incremental movement of the piston 38 causes the valve element 64 to be urged away from the lip 62, thereby permitting fluid communication between the inlet port 16 and outlet port 20. Accordingly, substantially the same pressures are delivered to both the primary and secondary braking circuits through the outlet ports 18 and 20, so that both the front and rear brakes of the towing unit are applied with substantially the same actuating pressure.

Assume now that the vehicle is being operated in the "bobtail" mode, i.e., the towing portion is being operated without the towed portion. Accordingly, as discussed hereinabove, the control port 100 will be vented to atmosphere. Fluid pressure acting on the face 102 of differential area piston 78 urges the latter downwardly viewing the Figure, thereby causing the valve element 86 to engage the projection 92 to open communication through the bore 84. However, since the area of the piston 78 exposed to the fluid pressure level in the chamber 104 is greater than the area of the face 102, only a portion of the pressure at the face 102 will be communicated to the chamber 104, since the lower pressure acting on the larger area will balance the piston 78, so that the pressure level in the chamber 104 will be a predetermined proportion of the pressure level at the outlet port 18 as long as the chamber 96 remains vented. The ratio of pressures across the piston 78 is a function of the differential area of the piston and the force of the spring 98. Accordingly, the pressure level communicated to the chamber 58 which operates the relay piston 38 will be a predetermined proportion of the pressure communicated to the outlet port 18. Since the pressure level at the outlet port 20 is controlled by the relay piston 38, this pressure level will also be the same predetermined proportion of the pressure level at the delivery port 18. Accordingly, when the towing unit is operated in the so-called "bobtail" mode, the pressure level at outlet port 20 will be a predetermined proportion of the pressure level at outlet port 18.

As discussed in the aforementioned U.S. Pat. No. 3,580,646, it is desirable that the valve element 64 be actuated under normal conditions by the relay piston 38 instead of by the direct mechanical link provided through the stem 36 because actuation of the secondary valve element 64 through the stem 36 would require very high actuating forces to overcome the various springs, and the friction between valve members. The inherent sequential operation of such a device is undesirable since different pressure levels could be created in the primary and secondary circuits. However, there are situations when it is desirable to actuate the valve element 64 through the stem 36 such as, for example, during a failure in the primary circuit. If the primary circuit fails, no pressure can be communicated to the relay piston 38, so that the valve cannot be actuated in this manner, but the valve can be actuated mechanically through the direct link provided by the stem 36 to the lip 68. If the tractor is being operated in the "bobtail" mode when it is necessary to actuate the valve mechanically, the resulting brake application will not be proportioned by the proportioning piston 78, so that a full brake application will occur in the secondary circuit. Accordingly, this mechanical "push-through" feature of the relay valve 10 always permits the rear brakes of the tractor to be applied to their complete unproportioned extent during circumstances when the valve 10 must be actuated through the "push-through" feature provided by the valve stem 36.

I claim:

1. Dual circuit brake valve having a pair of inlet ports, a pair of outlet ports, a pair of valve members in said housing, one of said valve members controlling communication between one of said inlet ports and a corresponding outlet port, the other valve member controlling communication between the other inlet port and its corresponding outlet port, manually actuated means for controlling one of said valve members, fluid pressure responsive relay means for operating the other valve member, passage means communicating the outlet port controlled by said one valve member with said fluid pressure responsive relay means for causing the latter to operate said other valve member in response to pressure changes at said outlet port controlled by said one valve member to thereby establish a corresponding pressure level at the outlet port controlled by the other valve member, and pressure proportioning means controlling communication through said passage means, said pressure proportioning means including a control port on said housing communicated with a signal pressure, said pressure proportioning means being responsive to said signal pressure to shift between a first condition permitting uninhibited communication through the passage means to communicate a pressure level to the relay means substantially equal to the fluid pressure level communicated to said outlet port controlled by the one valve member and a second condition wherein said pressure proportioning means proportions communication through said passage means to establish a fluid pressure level at said relay means which is a predetermined poroportion of the fluid pressure level communicated to said outlet port controlled by said one valve member.

2. Dual circuit brake valve as claimed in claim 1, wherein said manually actuated means includes push through means forming a rigid link operating said other valve member to permit unproportioned communication to the outlet port controlled by said other valve member regardless of the pressure level communicated through said pressure proportioning means to said relay valve means upon movement of the manually actuated means beyond the movement required to actuate said one valve member.

3. Dual circuit brake valve as claimed in claim 1, wherein said pressure proportioning means includes a differential area piston responsive to the fluid pressures thereacross to control valve elements to establish a proportionally lower fluid pressure level on one side of said piston than that on the other side of said piston, and disabling means carried by said piston responsive to said pressure level at said brake line to disable said valve elements to permit uninhibited communication through said passage means.

4. Dual circuit brake valve as claimed in claim 3, wherein said disabling means is a fluid pressure responsive area on said piston communicated to said pressure level at said brake line.

5. Dual circuit brake valve for an articulated vehicle comprising a towed portion and a towing portion and a fluid pressure brake line interconnecting the towed and towing portions, said brake valve comprising a housing having a pair of inlet ports and a pair of outlet ports, a pair of valve members in said housing, one of said valve members controlling communication between one inlet port and a corresponding outlet port, the other valve member controlling communication between the other inlet port and its corresponding outlet port, manually actuated means for controlling one of said valve members, fluid pressure responsive relay valve means responsive to the fluid pressure level at the outlet port controlled by said one valve member for controlling communication between the other inlet port and its corresponding outlet port as a function of the pressure level at the outlet port controlled by said one valve member, and pressure proportioning means for controlling communication to said relay valve means, said pressure proportioning means being responsive to the pressure level at said fluid pressure brake line to proportion fluid communication to said relay valve means to establish a pressure level at the latter proportionally less than the pressure level at the outlet port controlled by said one valve member when the pressure level at said brake line is less than a predetermined level and permitting substantially uninhibited communication to said relay valve means when the pressure level at said brake line is above the predetermined level.

6. Dual circuit brake valve for an articulated vehicle as claimed in claim 5, wherein said pressure proportioning means proportions communication to said relay valve means when the pressure level in the brake line is substantially atmospheric pressure indicative of a condition when the towing portion of the articulated vehicle is operated without the towed portion.

7. Dual circuit brake valve for articulated vehicle as claimed in claim 5, wherein passage means communicates the outlet port controlled by said one valve member with the relay valve means, said pressure proportioning means being located in said passage means.

8. Dual circuit brake valve for an articulated vehicle as claimed in claim 7, wherein said pressure proportioning means includes a differential area piston responsive to the fluid pressures thereacross to control valve elements to establish a proportionally lower fluid pressure level on one side of said piston than that on the other side of said piston, and disabling means carried by said piston responsive to said pressure level at said brake line to disable said valve elements to permit uninhibited communication through said passage means.

9. Dual circuit brake valve as claimed in claim 8, wherein said disabling means is a fluid pressure responsive area on said piston communicated to said pressure level at said brake line.

10. Dual circuit brake valve for an articulated vehicle as claimed in claim 5, wherein said manually actuated means includes push-through means forming a rigid link operating said other valve member to permit uninhibited communication to the outlet port controlled by said other valve member regardless of the pressure level communicated through said pressure proportioning means to said relay valve means upon movement of the manually actuated mneans beyond the movement required to actuate said said one valve member.

11. Dual circuit brake valve as claimed in claim 4, wherein said manually actuated means includes push through means forming a rigid link operating said other valve member to permit uninhibited communication to the outlet port controlled by said other valve member regardless of the pressure level communicated through said pressure proportioning means to said relay valve means upon moement of the manually actuated means beyond the movement required to actuate said one valve member.

* * * * *